Figure 1:
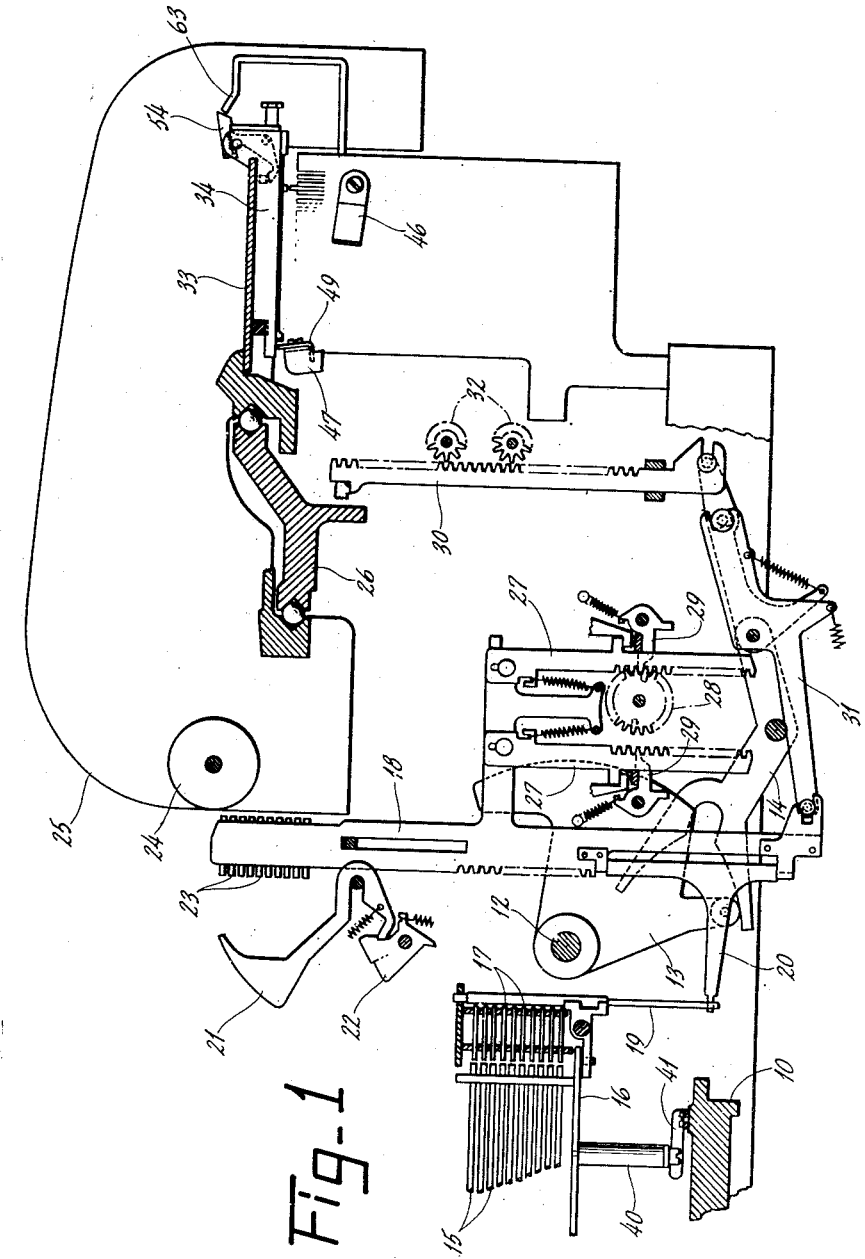

July 27, 1954

W. A. ANDERSON 2,684,808

AUTOMATIC SPACING STROKE CONTROL MECHANISM
FOR ACCOUNTING MACHINES

Filed Oct. 12, 1951

2 Sheets-Sheet 1

INVENTOR.
WALTER A. ANDERSON

BY

Jesse A. Holton

ATTORNEY

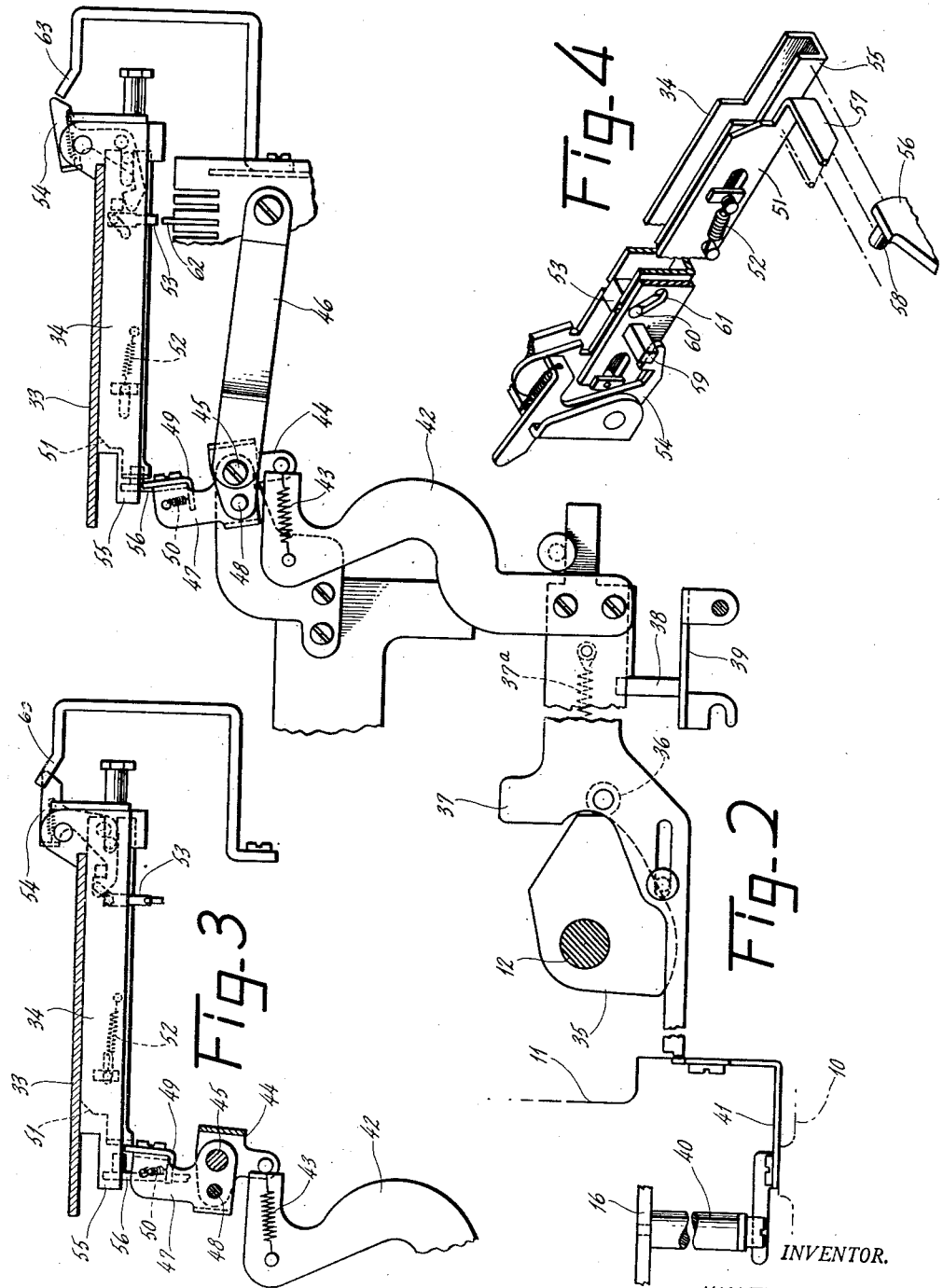

Patented July 27, 1954

2,684,808

UNITED STATES PATENT OFFICE 2,684,808

AUTOMATIC SPACING STROKE CONTROL MECHANISM FOR ACCOUNTING MACHINES

Walter A. Anderson, Trumbull, Conn., assignor to Underwood Corporation, New York, N. Y., a corporation of Delaware Application October 12, 1951, Serial No. 251,098

3 Claims. (Cl. 235—60.47)

This invention relates to accounting machines of the key-set, motor-operated type, having a traveling paper carriage with mechanism thereon for controlling the functions of the machine during the lateral movement of the carriage, and more particularly to mechanism for automatically determining the effectiveness of a control on the carriage which control prepares the machine for taking negative balances contained in the crossfooter.

The present invention is herein exemplified in a machine similar to that disclosed in U. S. Patent No. 2,194,270, issued March 19, 1940, to Oscar J. Sundstrand, to which reference may be had for an understanding of features of construction not fully described herein.

The above patent discloses a machine having a traveling paper carriage with machine function controlling mechanism, one crossfooter arranged for addition and subtraction, and a plurality of registers arranged for addition only. Also provided in the machine is a device to prevent the taking of a total until after a blank cycle is taken, the blank cycle being necessary in order to reset any transfer mechanism that was tripped during a preceding amount entering operation, and to engage the crossfooter with the subtraction actuators instead of the addition actuators when the crossfooter contains a negative balance.

In the use of the machine of the patent for one type of accounting, the carriage travels from column to column on the work sheets, controlling various machine functions in the different positions. The entries are listed on a first sheet by the operator who indexes the values on the keyboard. After the listing of the entries, the machine automatically makes a blank cycle and then takes a crossfooter sub-total to print a new balance. The original value entries are to be repeat-printed on a second form and for this purpose are stored in the registers from which they are printed as totals. Next the crossfooter, which is non-added during the register totals, is to be totalled to repeat print the balance on the second form.

In the machine of the patent, the crossfooter after a non-add cycle thereof is always reengaged with the addition racks at the end of the machine cycle and would therefore be ready for a positive total taking operation immediately after a register total-taking cycle. If, however, the crossfooter contains a negative balance, a blank cycle is required to engage the crossfooter with the subtraction racks. In the past it has been the practice to always make such blank cycle between the last register total column and the crossfooter total column to accommodate the occasional negative balance, with the result that most of such blank cycles have been of no effect and are merely time consuming.

It is then an object of the present invention to provide a mechanism that will normally permit the carriage to tabulate directly from a register totaling column to a crossfooter totaling column but, when the crossfooter contains a negative balance, will be set in a prior crossfooter sub-totaling column to cause arrest of the carriage in a blank cycle column intermediate the said total taking columns, to therein enable the movement of the crossfooter into engagement with the subtracting actuators.

Another object of the present invention is to provide a mechanism of the character described that is simple in construction, inexpensive to manufacture and assemble in the machine, and dependable in operation.

With these and incidental objects in view, the invention consists in certain novel features of construction and combination of parts, the important elements of which are herein set forth in appended claims, and a preferred embodiment of which is hereinafter described with reference to the drawings which accompany and form part of the specification.

In the drawings:

Figure 1 is a sectional view of an accounting machine incorporating the invention and showing a portion of the adding mechanisms and the carriage controls therefor, Figure 2 is a right side view of an accounting machine embodying the present invention, showing the mechanism in normal position, Figure 3 is a fragmental right side view of a portion of Figure 2 showing the mechanism actuated to enable the taking of a blank cycle when the crossfooter contains a negative total, and Figure 4 is a fragmental detail perspective view showing the construction of the negative total blank cycle control magazine.

Referring to Figure 1 of the drawings, showing a section of an accounting machine similar to that of the above patent, the machine base is indicated at 10 and carries a pair of vertical side frames indicated at 11, Figure 2. A main shaft 12 journaled in frames 11 carries a plurality of cams 13 for cooperation with type bar restoring arms 14. The usual keys, not shown, acting through push rods 15 mounted in a swinging gate 16, set pins 17 to represent an indexed amount. During a cycle of operation of the machine, shaft 12 is given a counterclockwise rotation of about 90° and is returned during which cycle arms 14 are rocked by cams 13 to permit the type bars 18 to rise until the tail pins 19 connected to swinging arms 20 contact the set ones of the pins 17 to differentially arrest the type bars at an indexed amount. When said type bars 18 are set to the desired amount, the hammers 21 are released from the hammer locks 22 to impel the type 23 in the upper end of type bars 18 to print on a work sheet about a platen 24 in a shiftable carriage 25 slidable on a rail 26 on the side frames 11.

Each type bar 18 also carries a pair of racks 27 on a rearward projection thereof to enter the indexed amounts additively or subtractively into a crossfooter 28 and, in conjunction with the usual transfer trip pawls 29, to arrest type bars 18 in total cycles to print the total standing in the crossfooter. A group of rear racks 30 connected to the type bars 18 by levers 31 are engageable by one or the other of a group of registers 32 to enter amounts into the register or take totals therefrom.

Secured to the rear of the carriage 25 is a control plate 33 carrying secured thereto a plurality of magazines 34 to determine various columnar positions and to therein control the various machine functions as set out in the above patent. For the reasons given above, one of these magazines 34 is so constructed that normally it does not arrest the carriage 25 but said magazine 34 may be set to arrest the carriage and at such position, initiate a blank cycle to shift crossfooter 28 into engagement with the subtraction racks 27 to enable a negative total to be taken.

Referring to Figure 2 of the drawings, a cam member 35 is fixed on shaft 12 and in the normal position of the machine engages a roller 36 supported on a member 37 mounted for slidable movement forwardly and rearwardly on the right side machine frame 11, and normally urged forwardly, leftwardly in Figure 2, against cam 35 by a spring 37a. Normally the slide 37 is prevented from moving forwardly when released by cam 35 by a stud 38 in a sliding member 39 forming part of the credit balance mechanism, the slide 39 being identified as 343 in Figure 33 of the above Sundstrand patent.

Fixed in swinging arm 16 is a depending stud 40 that depends into the path of movement of a slide 41 supported on the machine base 10 and on the machine frame 11. The slide 41 is normally urged to move rightwardly on the machine by means of a spring, not shown, to block movement of the slide 37 when arm 16 moves from restored position during indexing of an amount. Slide 41, which is the same part as 353, Figure 33 of the above Patent No. 2,194,270, is normally so held by arm 16 and stud 40 that, when no amount is indexed in the pins 17, a notch in the right end of slide 41 is held in alignment with the front end of slide 37 enabling slide 37 to move forwardly during a blank cycle if stud 38 has moved to indicate that a negative total is present in the crossfooter 28.

Secured to the rear end of slide 37 is an upstanding arm 42. A spring 43 on the upper end of arm 42 yieldingly connects the arm with a cradle 44 pivoted on a stud 45 in a bracket 46. A second cradle 47 pivoted on stud 45 is adjustably secured to a rod 48 in cradle 44 to accommodate various spacing requirements in the accounting forms to be used. Fixed to an upper arm of cradle 47 is an actuating plate 49, said plate 49 being depressible and normally held in an upper position by a spring 50.

Secured to the carriage control plate 33 and aligned vertically with the actuator plate 49 is a credit balance spacing stroke magazine 34, see also Figure 4. This magazine carries a skip tabulating slide 51 normally urged to a forward position by a spring 52, a projectable lug 53 to control a repeat cycle of the machine and a latch 54 to hold slide 51 in a rearward position. Normally during operation of the machine, the carriage 25 is arrested in a columnar position by the engagement of a forward extension 55 of one of the magazines 34 against the usual depressible tabulator stop 56. Slide 51 of the credit balance spacing stroke magazine 34 is, however, formed with a bent-off cam-shaped ear 57 which in the normal position of slide 51 will contact a stud 58 on the stop 56 to depress the stop 56 out of the path of the end 55 of magazine 34 and thus prevent arrest of the carriage in that columnar position.

When slide 37 moves forwardly during a cycle, cradles 44 and 47 are rocked clockwise through spring 43 and if magazine 34 is at that time horizontally aligned with actuator plate 49 the plate 49 will engage ear 57 to move slide 51 rearwardly to the dotted line position of Figure 4 wherein latch 54 may engage a stud 59 on the slide 51 to hold the slide in its rearward position. In such rearward position of slide 51, its ear 57 is to the rear of stud 58 and tabulator stop 56 is not prevented from engaging the end 55 of the magazine to arrest the carriage 25 in the corresponding column. The motor repeat lug 53 is projected downwardly when slide 51 is moved rearwardly by the engagement of a pin 60 on the lug in an inclined slot 61 of slide 51. In the depressed position of lug 53, it contacts the usual motor repeat control 62 to initiate a cycle of operation of the machine. The latch 54 is released at a later point in the machine cycle by the engagement of a stationary cam 63 fixed in the machine frame with the upper end of latch 54 during a carriage movement, to free stud 59 and permit spring 52 to restore slide 51 to its normal position.

Summarizing, the necessity for a blank cycle before the crossfooter total taking cycle is automatically determined in a preceding columnar position wherein the crossfooter is sub-totalled. During such crossfooter sub-totalling cycle and the immediately prior blank cycle, slide 37 moves forwardly only when the crossfooter total is negative. Such forward movement of slide 37 is utilized to shift to the rear slide 51 of magazine 34 which is for that cycle aligned with actuator plate 49 and thus enable the magazine 34 to control a blank cycle when the carriage 25 enters the negative total blank cycle columnar position. Slide 51 is released during an ensuing carriage return movement to again cause skipping of that blank cycle column until the next negative total occurs.

The above description of a preferred embodiment of my invention should not be taken in a limiting sense as the structure is capable of many changes and alterations without a departure from the spirit of the invention as defined in the following claims.

What is claimed is:

1. In an accounting machine of the class described having a plurality of registers including a crossfooter register, a traveling carriage shiftable to different columnar positions, tabulator stop and function control members on said carriage, one of said control members being normally ineffective to arrest said carriage or to control a machine function, a function control slide in said machine, a spring urging said slide in one direction, a cyclically operated cam to release said slide for movement in said one direction during machine cycles and to restore said slide, an indexing mechanism controlled stop for said slide, said stop normally free of said slide but retaining said slide against movement by said spring when an amount is indexed in said indexing mechanism, and a crossfooter controlled stop to arrest said slide when said crossfooter contains a positive total, a cradle rockable by said slide during movement thereof and abutting means on said cradle and said normally ineffective control member, said abutting means cooperative when said carriage is in a predetermined position to render said control member effective to arrest said carriage and to control said machine when said cradle is rocked by said slide.

2. In an accounting machine of the class described having a crossfooting register, a traveling carriage, a plurality of column stop members on said carriage, a tabulator stop to engage any of said column stop members and thereby arrest said carriage in columnar positions, a slide on one of said column stop members to normally contact said tabulator stop during carriage travel and move said tabulator stop to an ineffective position with respect to said column stop member, said slide being shiftable into another position wherein it does not contact said tabulator stop, a latch to retain said slide in the shifted position, and a function control bar in said machine, said bar operating to enable the taking of a negative total from said register, setting means engageable with said slide on said one column stop member when a predetermined other one of said column stop members is engaged by said tabulating stop, and means connecting said function control bar and said setting means to operate said setting means and move said slide to the latched position when a negative total is taken from said register and said predetermined column stop member is engaged with said tabulator stop.

3. In an accounting machine of the class described having a frame, a traveling carriage shiftable on said frame to different columnar positions, a plurality of column stop units on said carriage and a depressible tabulator stop engageable with any of said column stop units to arrest said carriage in said columnar positions, a slide on one stop unit to normally depress said tabulator stop and thereby prevent arrest of said cariage at said columnar position, a latch to retain said slide in an ineffective position with respect to said tabulator stop and a stationary cam to release said latch during movement of said carriage, the combination of a rockable member on said frame to set said slide to the ineffective position, said rockable member cooperative with said slide in a predetermined position of said carriage, a function control slide on said frame, a crossfooter controlled stop for said function control slide to free said slide only if said crossfooter contains a negative total, an amount indexing mechanism, a second stop for said function control slide to prevent movement of said slide if an amount is entered in said indexing mechanism, cyclically operated means to release and thereafter restore said function control slide during each cycle of operation of said machine, and a connection between said function control slide and said rockable member whereby said column stop slide is set to the ineffective position only if a negative total is taken from said crossfooter with the carriage in said predetermined position.

References Cited in the file of this patent

UNITED STATES PATENTS

| Number | Name | Date |
|---|---|---|
| 2,194,270 | Sundstrand | Mar. 19, 1940 |
| 2,214,897 | Bower | Sept. 17, 1940 |
| 2,254,765 | Anderson | Sept. 2, 1941 |
| 2,270,614 | Anderson | Jan. 20, 1942 |